Nov. 24, 1942.                C. V. SMITH                2,302,918
            METHOD OF MOLDING BLANKS OF PREDETERMINED MASS
                         Filed Sept. 12, 1940
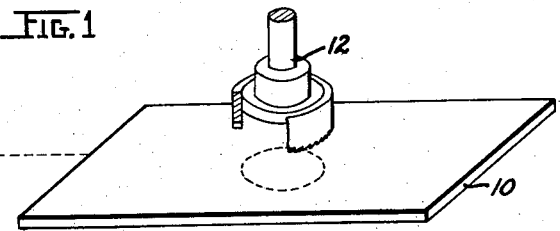
STEP 1
MILL OUT BLANK TO ACCURATE
DIAMETER FROM SHEET
OF ACCURATE THICKNESS
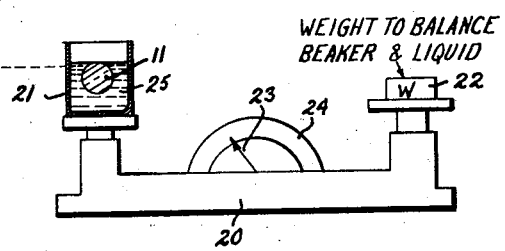
STEP 2
MEASURE VOLUME OF BLANK
BY WEIGHING EQUAL VOLUME
OF WATER. OR WEIGH BLANK
DIRECTLY
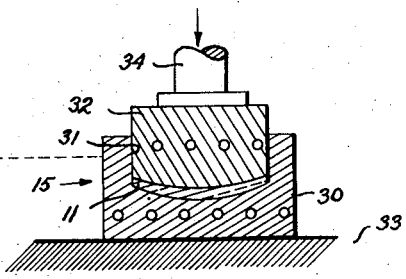
STEP 3
PLACE BLANK IN CLOSED MOLD
AND HEAT TO ANY MOLDABLE
TEMPERATURE
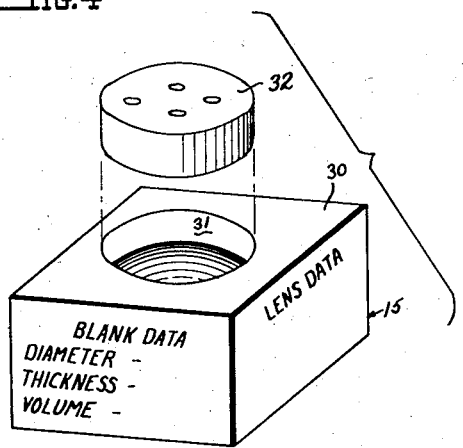
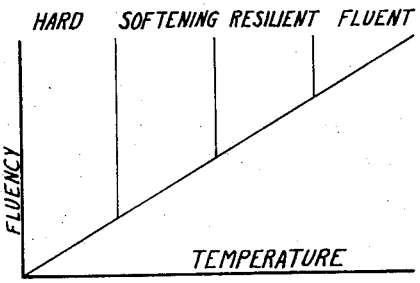
INVENTOR
CHARLES V SMITH
BY
ATTORNEY Patented Nov. 24, 1942

2,302,918

UNITED STATES PATENT OFFICE 2,302,918

METHOD OF MOLDING BLANKS OF PREDETERMINED MASS

Charles V. Smith, Dayton, Ohio, assignor to The Univis Lens Company, Dayton, Ohio, a corporation of Ohio Application September 12, 1940, Serial No. 356,523

4 Claims. (Cl. 18—55)

This invention relates to a method for producing an optical article from unbreakable materials, such as synthetic resins.

It is an object of the invention to provide a method for producing optical articles wherein a blank of resinous material of predetermined size is used to produce an optical article.

It is another object of the invention to produce an optical article of determined size from a predetermined volume of a mass of resinous material.

It is another object of the invention to provide a method for producing an optical article from a predetermined mass of resinous material, and of confining the mass within a mold cavity for pressing into the shape of the optical article.

It is another object of the invention to provide a method for producing an optical article wherein a mass of resinous material of predetermined size or volume is produced, and is subsequently checked for accuracy of size or volume, after which the checked and corrected mass of resinous material can be formed within a confining mold into an optical article of predetermined size.

It is another object of the invention to provide a method for producing optical articles wherein the final dimensions for the article are controlled by the total volume of a predetermined mass of resinous material.

It is another object of the invention to provide a method for producing optical articles of determined circumferential dimension and to control the thickness of the article by the volume of the mass of resinous material formed into the optical article.

It is another object of the invention to produce an optical article by removing a blank of resinous material of predetermined circumferential dimension from a sheet of resinous material of determined thickness, and to subsequently form the blank of predetermined size within a confining mold into the shape of an optical article of determined dimension.

It is another object of the invention to provide a method for producing an optical article from a predetermined mass of resinous material, and of confining the mass within a mold cavity for pressing into the shape of the optical article within a confining mold, the volumetric content of the mass providing a stop to determine the thickness of the article.

It is another object of the invention to provide a method for producing an optical article from a predetermined mass of resinous material, and of confining the mass within a mold cavity for pressing into the shape of the optical article within a confining mold, the volumetric content of the mass providing a stop to limit the movement of the moving mold member to thereby determine the thickness of the article.

It is another object of the invention to produce an optical article by positioning a determined mass of material within a confining mold and applying pressure thereon to form same to a thickness determined by the volumetric content of the mass, and to subsequently hold pressure on the mass while the same is setting to provide follow up of the mold surfaces against the surface of the mass, the follow up being required due to shrinkage of the mass during setting.

Another object of the invention is to compress a mass of material within a confining mold to a thickness determined by the volumetric content of the mass, and hold the pressure upon the mass during setting to follow up shrinkage of the mass caused by setting.

Another object of the invention is to compress a mass of material within a confining mold by applying pressure upon a die element movable to a fixed position relative the other die element, said position being determined by the volumetric content of the mass, and of holding pressure upon the movable die element during setting of the mass to cause same to follow the shrinkage of the mass caused by setting thereof.

It is another object of the invention to produce a mass of resinous material of a size or volume substantially equal to the size or volume required to produce an optical article of determined dimension, and to weigh the mass of resinous material and correct the same to a determined size or volume, and to subsequently form the corrected mass of material into an optical article of determined size.

It is another object of the invention to produce an optical article having a surface finish of optical perfection.

It is another object of the invention to produce a mass of resinous material of determined size or volume which is to be positioned within a mold of a determined size to produce an optical article of determined dimensions, the mold being a confining mold to permit the elevation of the temperature of the mass of the resinous material into a fluent condition.

It is still another object of the invention to produce a mass of resinous material of determined size or volume and to position the mass within a confining mold in a manner that pressure can be applied thereupon sufficient to prevent deterioration of the resinous material when elevating the temperature thereof within the fluent range for forming an optical article from the mass of resinous material while the mass is fluent.

It is another object of the invention to provide a method for producing an optical article wherein a determined volume of the resinous material is positioned within a confining mold, the volume of the material limiting the movement of the pressure member of the mold, and controlling the dimensions of the article by the total volume of the mass.

It is another object of the invention to produce an optical article in accordance with the aforementioned objects wherein the mass of material is moved at a predetermined rate.

It is another object of the invention to produce an optical article in accordance with the aforementioned objects wherein the temperature of the mass is elevated within a predetermined range, and the mass is moved at a rate determined by the temperature at which the mass is to be worked.

It is another object of the invention to produce an optical article from a mass of resinous material and to weigh the volume of the material to determine the accuracy of the volume prior to formation of the mass into an optical article of determined dimensions.

Further objects and advantages of the present invention will be apparent from the drawing and the following description.

In the drawing:

Figure 1 is a perspective elevational view of a device for producing a mass of resinous material of determined size or volume, representing the first step in the method for producing optical articles;

Figure 2 is a side elevational view of a device for checking the weight or volume of a mass of resinous material, and represents a second step in the method for forming optical articles;

Figure 3 is a cross-sectional view of a confining mold for forming an optical article from a mass of resinous material of predetermined size or volume, and represents a third step in the method for producing optical articles;

Figure 4 is a perspective elevational view of a mold which can be used in accordance with the teachings of the invention;

Figure 5 is a curve chart representing the range of temperatures within which a mass of resinous material can be worked.

In this invention there is provided a method for producing an optical article of a determined size from a determined mass of resinous material. Other methods for forming optical articles from resinous materials have entailed manipulations of the optical article after removal from the forming dies. Such manipulations, as trimming the edges, and forming the optical article to a particular peripheral shape, are neither desirable nor necessary.

In this invention the optical article is formed from a mass of resinous material which has been determined to be of proper volume to produce an optical article of a predetermined size. By predetermining in advance the volume which the finished optical article will assume, I am able to produce a mass of resinous material which has the proper volume to produce the optical article, and upon forming the article to the desired shape, which will be in a finished condition when removed from the forming dies, the forming die can be arranged to produce an optical article of any desired configuration, which may include the production of lenses, planos, prisms, and many other optical articles.

Further, by predetermining the volume of the mass of resinous material to be used to produce an optical article of determined size, I can position the mass within a mold which totally confines the mass and apply any degree of pressure desirable upon the mass and still be sure that the mass will produce an optical article having a determined thickness, the thickness of the article being determined by the volumetric content of the mass. Also, since I can totally confine the mass I can limit the movement of the pressing plunger of the mold and thus eliminate the use of fixed stops, yet providing a fixed stop by the volumetric content of the mass of material itself. Since I can eliminate definite stops between the mold elements, the movable mold element can be caused to follow up the shrinkage of the mass of material confined in the mold, caused by setting the mass, to retain engagement of the forming surfaces upon the mass of material throughout the setting period.

The general method of the invention is to first provide a mass of resinous material of a determined volume. This may be accomplished in a number of ways, such as by casting a mass of resinous material within a mold of determined dimensions, or by machining a mass of resinous material to determined dimensions, or a mass may be formed within a suitable die and pressed to determined dimensions. Any of the former methods for producing a mass of resinous material of determined volume is suitable for use in the first step of my method.

However, I have disclosed one specific form of an apparatus for producing a mass of resinous material of a determined volume. This form of apparatus is not to be considered as limiting my invention, but merely illustrates one way in which I can produce a blank of resinous material of a determined volume.

In this invention I provide a sheet of resinous material 10 from which a disk 11 can be removed by means of the circular cutting device 12. The sheet of resinous material 10 is of a determined thickness so that when the cutter 12 removes a disk of material 11 from the sheet 10 the disk will contain a certain volume. The volume of the disk 11, however, may vary slightly from a volume which is specified to form an optical article of specific dimensions. These variations may occur due to the condition of the circular cutter 12, or the variance in thickness of the sheet 10. When producing an optical article according to the teachings of my invention, it is essential that the total volume of the mass of the resinous material be accurately controlled.

As an example of an optical article which can be formed, according to the teachings of my invention, and which is required to have accurate dimensions retained upon the finished article, I disclose my method as producing an eye-glass lens. When producing eye-glass lenses the peripheral dimensions of the lens are of a determinable order. Further, to produce a lens of a given power and of a given correction it is required that the thickness of the lens be controlled. Therefore, for a lens of a particular peripheral shape and for a specific prescription the volume the finished lens will assume can be predetermined. This volume, once determined, will remain constant for any lens produced to a specified prescription and to a specific peripheral contour. Thus, various molds can be provided, such as the mold 15, upon which the lens data, or prescription data, can be inscribed. To produce a lens to the prescription data and of the peripheral shape of the mold the volume of a mass of resinous material, sufficient to produce the specific lens can be inscribed upon the mold as part of the blank data. Also, as part of the blank data the diameter and thickness of the blank may be computed and inscribed upon the mold since under certain conditions of providing the blank the diameter and thickness may be the only required dimensions to be known, the total volume of the blank always being the final check as to correctness of the size of the blank for producing the lens meeting the prescription data.

If the sheet of resinous material 10 is maintained at a uniform density and at a uniform thickness, and if the circular cutter 12 is always maintained in excellent condition, the disk 11 removed from the sheet 10 will always have a constant volume. Under these ideal conditions, it would not be necessary to have any check upon the volume of the disk 11. However, since these ideal conditions are probably never met or, at least not continuously maintained in a production schedule, it may be necessary to check the volume of the disk 11.

To check or weigh the volume of the disk 11 removed from the sheet 10, I provide a balance scale 20. A container 21 filled with fluid is positioned upon one arm of the scale 20 while a counterbalancing weight 22 is provided upon the opposite arm of the scale. An indicating hand 23 is deflected over a suitable scale 24 to indicate the off-balance of the container 21 and the fluid contained therein with respect to the counterbalance weight 22 when the disk 11 is placed in the fluid.

The disk 11 removed from the sheet of resinous material 10 may be positioned within the fluid 25 of the container 21. If the disk 11 is just submerged in the fluid 25, the displacement of the fluid by the disk 11 will be registered upon the scale 24 by the hand 23.

A body wholly or partly immersed in a fluid is buoyed up with a force which is equal to the weight of the volume of the fluid which the body displaces. Since bodies of equal volume will displace equal volumes of fluid, the weight of the fluid displaced can be used as a measure of the volume of the body since it is equal to the apparent loss of weight of the body when immersed, which weight will be added upon the scale. Since it takes equal force to submerge all bodies of equal volume, that force can be registered upon a scale, which scale can be calibrated to read directly in volume. Thus, when the disk 11 is submerged in the fluid 25, the weight of the fluid displaced by the disk 11 will be reflected by the hand 23, so that the volume of the disk can be read directly upon the scale 24. If the disk 11 should be oversized, to meet the specified volume for a particular lens, a portion of the mass of the disk 11 can be removed from the edge surfaces to correct the volume to the specified volume. However, if the disk should be undersized it would ordinarily be cast aside, and for this reason, it may be advisable to normally produce the disks 11 slightly oversize so that they can be corrected to their proper volume.

While under normal circumstances the volume of the mass of resinous material is the important element, yet if the density of the sheet of resinous material 10 is accurately controlled, and the thickness thereof is accurately controlled, and if the cutter 12 is maintained in perfect condition, the volume of the disk 11 will always be constant. Hence, under these circumstances, it may not be required that the volume of the blank or the disk 11 need be checked.

Thus, the first step in my method is to produce a mass of resinous material which will have a specified volume or dimensions which have been predetermined to be such that the mass of material will produce an optical article of predetermined dimensions. This step may include either a single step of producing the mass of resinous material to accurate dimensions, or volume, or may include a second step for checking the volume of a mass of resinous material and correcting the mass to the proper volume. It may be also understood that while I have specifically mentioned volume of a mass of material, I can also directly weigh the material upon a suitable scale, which total weight of a mass of material would also determine the volume occupied by the mass.

After I have produced a mass of material of specified volume or weight, I then position the mass within a confining mold. As disclosed in Figures 3 and 4, the mold 15 consists of a body 30 in which a recess 31 is provided which forms the mold cavity. A cooperating plunger 32 is adapted to slide within the mold cavity 31 in close engagement with the side walls thereof so that when the disk 11 is positioned between the elements 30 and 32 of the mold 15, it will be totally confined. This mold can be placed in a suitable press, the body 30 resting along the press base 33, while a press plunger is caused to engage the plunger element 32 of the mold 15 to force the same downwardly into the mold cavity 31, and into engagement with the disk 11. The pressing plunger 34 forces the mass of the disk 11 to move to assume the configuration of the confining space between the mold elements 30 and 32. Since the volume of the disk 11 has been accurately controlled it can readily be seen that the mass of resinous material, of the disk 11, will fill a definite portion of the mold cavity 31, and since this volume has been controlled the final thickness of the finished optical article will be controlled. The plunger element 32 thus needs no definite stop in order to control the final thickness of a lens, which can be produced by formation of the disk 11, since the total volume of the disk 11 is such that it completely fills the mold cavity to the proper thickness, whereby the plunger element 32 is prevented from further movement.

After the mass of the material has been formed into the desired shape of the optical article the mass can be set by suitable means. This setting process causes the mass to shrink, and particularly if the mass has been elevated in temperature during the forming process. To prevent the surface of the mass from shrinking from the forming surfaces of the mold, the forming pressure is retained upon the plunger element 32 during the period through which setting occurs. Since the mold has no limiting stop except the mass of the material itself, it can be seen that the plunger element 32 will follow the surface of the mass within the mold in accordance with the shrinkage of the mass and retain the surfaces of the mass in engagement with the forming surfaces, and particularly those surfaces of optical perfection provided on the face of the plunger 32 and in the bottom face of the mold 30.

It can thus be seen that since I provide a definite volume of a mass of material to be formed into an optical product that I can eliminate definite stops between the mold elements 32 and 30 and depend upon the volumetric content of the mass of material itself to limit the movement of the plunger 32 and control the thickness of the optical product. Also, I provide a means for obtaining follow up of the shrinkage of the mass of material within the mold without the use of extra equipment, the arrangement of the plunger 32 and mold 30 providing inherent means for securing the follow up.

To assist the formation of the mass of resinous material in the disk 11, the mold elements 30 and 32 may be heated, whereby the temperature of the mass of resinous material is raised within a range in which the formation thereof is more easily accomplished.

To preserve the optical qualities of a mass of resinous material which is deformed while in the solid state, I have found that the rate at which it is deformed must be controlled. If the material is moved too rapidly there are internal strains produced which can be termed "optical strain." These optical strain are not such as impair physical properties of the resinous material, but are such that they displace the optical paths through the material, causing bi-refringence.

I have found that if a mass of resinous material is deformed, while in the solid state, at a certain specified rate that these optical strain are not produced. The rate at which the material can be deformed is determined somewhat by the temperature at which the material will be worked, and in general the rate is greater for the higher temperature of working for the blank. This rate of deformation cannot be set forth as a specified rate but must be determined for each resinous material and for the temperature at which the material is to be formed. However, I have found that such a rate does exist, and if the deformation of the material is carried out at a rate greater than is determined to be proper for the particular material at the temperature it is to be worked, that the optical strain is produced. This optical strain is always characterized by bi-refringence.

I have also found that if the material is formed at a rate of deformation which preserves the optical properties of the material that the physical properties of the material will also be preserved. Such detrimental physical properties as loss of hardness, loss of resistance to chemical action, increased fragility, and susceptibility to shattering are not encountered.

Thus, in forming a mass of resinous material when in the solid state during the forming step of my method, I control the rate of deformation to preserve the optical properties of the material.

However, under certain circumstances, it may be desirable to elevate the temperature of the mass of resinous material into a range at which the material will become fluent, or substantially fluid. Under these conditions most of the plastic materials, and particularly the synthetic plastics, are characterized by deterioration due to loss of various chemical constituents, if the material is not kept under pressure and completely confined while heating the material to the substantially fluid condition.

Thus, in my mold 15 the mold element 32 may fit closely to the walls of the mold cavity 31. The mass of resinous material 11 may be positioned within the mold cavity 31 while in the solid or semi-solid condition. The total volume or weight of the mass of material for the disk 11 has been properly determined. Pressure will then be applied upon the mass of the disk 11 to place the same under pressure, specific control over the rate of deformation not being required since the material will be heated to a substantially fluid stage wherein all internal strains will be relieved due to the fluidity of the material.

The temperature of the mold elements 30 and 32 will then be raised to a temperature sufficient to bring the mass of resinous material of the disk 11 to a substantially fluid condition. Since the mass of material is totally confined within the mold 15, and since pressure is being applied upon the fluent mass of material, chemical deterioration is prevented while, at the same time, the mass of material is formed to the desired shape of the mold cavity, the total volume of the fluent material determining the thickness of the optical article formed thereby, while the peripheral shape of the mold determines the shape of the article. It is thus seen that in this arrangement I do not need a fixed stop to control the movement of the plunger element 32 of the mold 15, since the volume of the fluent material is used as the controlling factor, just as the total volume of the mass of resinous material, when in solid or semi-solid condition, is used as the controlling factor when forming the mass while in a solid or semi-solid state. It is thus seen that I provide a method for accurately determining the finished dimensions of an optical article, controlling its peripheral shape by the shape of the mold cavity to be filled by the mass of resinous material, and also controlling the thickness thereof by the total volume of the mass, as well as obtaining inherent follow up of the shrinkage of the mass.

When producing optical articles from a mass of resinous material it is desirable that a surface finish of high optical perfection shall be imparted to certain requisite surfaces. The surfaces of the mold cavity which are the particular surfaces by which surfaces of optical perfection will be produced upon the finished optical article are provided with a surface of high optical perfection which can be imparted to the mass of material upon engagement therewith. This surface of optical perfection for the mold surfaces, can be produced in any one of a number of ways, the requisite being that it shall be of sufficient perfection that the surface of the optical article engaged thereby will have a surface of sufficiently high finish that it will not impair its use as an optical article.

While I have described my invention with regard a specific apparatus and with regard lenses, particularly eye-glass lenses as a specific example, I do not intend that my invention is to be limited by such description. I am able to produce, by the teachings of my invention, any optical article, such as lenses, planos, prisms, or any other article required to have determined dimensions. I am capable, by practising my invention, of producing completely finished articles of determined size or volume, and of imparting to the article any desired number of surfaces of optical perfection. Further, I am able to work a plastic material either in a solid, semi-solid, or fluid condition, the teachings of my invention providing an arrangement to prevent the chemical deterioration of plastic materials.

Having thus fully described by invention, what I claim as new and desire to secure by Letters Patent is:

1. A method of producing a solid blank of resinous material for use in a totally confining mold in producing a high precision optical article which consists of, removing a solid blank from a sheet of resinous material that has a uniform density and a uniform thickness, removing the blank from the sheet in a size that the weight of the blank is greater than the weight of the optical article to be produced therefrom, weighing the blank to determine the exact weight thereof as compared to the weight of the optical article, removing material from the blank to reduce the weight thereof to the exact weight of the optical article, and reweighing the blank to determine the weight of material removed therefrom and the correctness of the new weight as compared to the weight of the optical article.

2. A method of producing a solid blank of resinous material for use in a totally confining mold in producing a high precision optical article which consists of, removing a solid blank from a sheet of resinous material that has a uniform density and a uniform thickness, removing the blank from the sheet in a size that the volume of the blank is greater than the volume of the optical article to be produced therefrom, weighing the blank to determine the exact volume of the blank as compared to the volume of a finished optical article formed therefrom, removing material from the blank to reduce the volume thereof to the exact volume of the optical article, and reweighing the blank to determine the volume of the material removed therefrom and the correctness of the new volume as compared to the volume of the optical article.

3. A method of producing a solid blank of resinous material for use in a totally confining mold in producing a high precision optical article having a predetermined perimetrical dimension, a predetermined volume, and a predetermined power which consists of, producing a sheet of resinous material having a uniform density and a uniform thickness, removing a blank from the sheet in a size that the volume of the blank is greater than the volume of the optical article to be produced therefrom, weighing the blank to determine the exact volume of the blank as compared to the volume of a finished optical article formed therefrom, removing material from the blank to reduce the volume thereof to the exact volume of the optical article, and reweighing the blank to determine the volume of the material removed therefrom and the correctness of the new volume as compared to the volume of the optical article.

4. A method of producing a solid blank of resinous material for use in a totally confining mold in producing a high precision optical article having a predetermined perimetrical dimension, a predetermined volume, and a predetermined power which consists of, producing a sheet of resinous material having a uniform density and a uniform thickness, removing a blank from the sheet in a size that the volume of the blank is greater than the volume of the optical article to be produced therefrom and the perimetrical size of the blank is slightly larger than the perimetrical size of the optical article, weighing the blank to determine the exact volume of the blank as compared to the volume of a finished optical article formed therefrom, removing material from the blank to reduce the perimetrical size and volume thereof to produce the exact volume of the optical article, and reweighing the blank to determine the volume of the material removed therefrom and the correctness of the new volume as compared to the volume of the optical article.

CHARLES V. SMITH.